US011349424B2

(12) United States Patent
Li

(10) Patent No.: US 11,349,424 B2
(45) Date of Patent: May 31, 2022

(54) OBSERVER DESIGN FOR ESTIMATING MOTOR VELOCITY OF BRUSH ELECTRIC POWER STEERING SYSTEM

(71) Applicant: Steering Solutions IP Holding Corporation, Saginaw, MI (US)

(72) Inventor: Kun Li, Suzhou (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 143 days.

(21) Appl. No.: 16/740,164

(22) Filed: Jan. 10, 2020

(65) Prior Publication Data

US 2021/0218357 A1 Jul. 15, 2021

(51) Int. Cl.
*H02P 23/12* (2006.01)
*B62D 5/04* (2006.01)
*H02P 23/14* (2006.01)

(52) U.S. Cl.
CPC .............. *H02P 23/12* (2013.01); *B62D 5/046* (2013.01); *H02P 23/14* (2013.01); *H02P 2207/05* (2013.01)

(58) Field of Classification Search
CPC ...... H02P 23/12; H02P 23/14; H02P 2207/05; B62D 5/046
See application file for complete search history.

(56) References Cited

U.S. PATENT DOCUMENTS

| 4,445,779 A * | 5/1984 | Johnson ................. G01C 19/70 318/631 |
| 5,159,254 A * | 10/1992 | Teshima ............. G05B 19/4063 318/610 |
| 5,495,158 A * | 2/1996 | Schmidt .................. H02P 23/16 318/561 |
| 5,623,189 A * | 4/1997 | Hemmer ............ B65H 23/1806 318/432 |
| 6,060,854 A * | 5/2000 | Yutkowitz ............ G05B 19/404 318/574 |
| 6,470,225 B1 * | 10/2002 | Yutkowitz ............... G05B 11/28 700/188 |
| 6,566,835 B1 * | 5/2003 | Yoshida ............... G05B 19/404 318/569 |
| 7,548,035 B2 * | 6/2009 | Endo ...................... B62D 5/046 318/400.02 |
| 8,710,777 B2 * | 4/2014 | Tian .................... G01M 13/025 318/400.1 |
| 10,543,868 B2 * | 1/2020 | Mori ....................... H02P 21/05 |
| 10,627,807 B2 * | 4/2020 | Iijima .................. G05B 19/416 |
| 10,812,002 B2 * | 10/2020 | Gonschorek ............ H02P 21/08 |

(Continued)

*Primary Examiner* — Muhammad S Islam
*Assistant Examiner* — Devon A Joseph
(74) *Attorney, Agent, or Firm* — Dickinson Wright PLLC

(57) ABSTRACT

A motor control system of a motor is provided. The system includes a state estimation observer that computes an estimated velocity based on an inertia-damping response to the dynamics of the motor shaft, a torque command signal, and the compensated command signal. This compensated signal comes from a proportional-integral-derivative (PID) controller that determines a difference between a sensed position and an estimated position. The estimated position is determined by the estimated velocity and an integrator. The control system may also include a motor-velocity based lowpass filter which applies a filter to the estimated velocity.

4 Claims, 6 Drawing Sheets

(56) References Cited

U.S. PATENT DOCUMENTS

| | | | | |
|---|---|---|---|---|
| 2002/0156541 A1* | 10/2002 | Yutkowitz | ............... | G05B 11/42 |
| | | | | 700/28 |
| 2006/0202655 A1* | 9/2006 | Shoji | .................... | G05B 19/404 |
| | | | | 318/626 |
| 2007/0007072 A1* | 1/2007 | Ta | .......................... | B62D 5/046 |
| | | | | 180/446 |
| 2007/0107978 A1* | 5/2007 | Aoki | .................... | B62D 5/0472 |
| | | | | 180/446 |
| 2007/0255454 A1* | 11/2007 | Dariush | ................. | G06N 3/008 |
| | | | | 700/245 |
| 2009/0009127 A1* | 1/2009 | Imamura | .............. | G05B 13/025 |
| | | | | 318/601 |
| 2013/0026963 A1* | 1/2013 | Sonoda | .............. | G05B 13/0205 |
| | | | | 318/561 |
| 2013/0320893 A1* | 12/2013 | Aoki | ...................... | B62D 5/049 |
| | | | | 318/400.18 |
| 2014/0265962 A1* | 9/2014 | Gebregergis | ............ | H02P 29/50 |
| | | | | 318/400.23 |
| 2014/0365077 A1* | 12/2014 | Kariatsu | ................ | B62D 6/002 |
| | | | | 701/41 |
| 2018/0241334 A1* | 8/2018 | Kobayashi | ................ | H02P 6/10 |
| 2019/0242924 A1* | 8/2019 | Lang | ........................ | G01P 5/165 |
| 2019/0260322 A1* | 8/2019 | Kishimoto | ........... | G05B 19/416 |
| 2019/0315398 A1* | 10/2019 | Moreillon | ................ | B62D 6/10 |
| 2020/0195176 A1* | 6/2020 | Ho | ...................... | H02P 21/0025 |
| 2020/0316743 A1* | 10/2020 | Okamoto | ............. | B23Q 15/013 |
| 2021/0167703 A1* | 6/2021 | Pramod | .................... | H02K 3/28 |

\* cited by examiner

OBSERVER DESIGN FOR ESTIMATING MOTOR VELOCITY OF BRUSH ELECTRIC POWER STEERING SYSTEM

CROSS-REFERENCE TO RELATED APPLICATION

None.

STATEMENT REGARDING FEDERALLY SPONSORED RESEARCH OR DEVELOPMENT

None.

BACKGROUND

1. Technical Field

Apparatuses and methods consistent with example embodiments relate to electric power steering (EPS) systems, and more particularly, to estimation of a motor velocity in EPS systems.

2. Description of the Related Art

In a control system, such as an EPS, a state observer is a system or module that provides an estimate of an internal state of the control system, based on measurements of inputs and outputs of the system. Knowing the internal system state facilitates addressing technical problems associated with the real system, such as, for example, stabilizing the real system using state feedback. Typically, the physical internal system state of the EPS cannot be determined by direct measurement, due to financial considerations and the unfeasibility of installment of sensors. Instead, indirect effects of the internal state are observed by way of the system outputs, which can be more easily measured. In such cases, a state observer module facilitates reconstruction of at least a part of the internal system state based on the output measurements.

For example, an EPS system includes a motor that facilitates providing a driver assist during operation of the EPS system, in that it facilitates EPS system functions enabling a better steering feel. Motor velocity is a critical signal for control of the EPS system. The motor velocity may be directly measured using sensors and/or tachometers. However, such direct measurement requires additional hardware, which leads to additional costs as well as engineering, particularly for the design of an EPS with a brushed motor aimed at low-end customers. Accordingly, it is desirable to use a state observer module to estimate the motor velocity signal in addition to other aspects of the working of the EPS system, without significant loss of accuracy.

In certain cases, if the differential of a position signal is used to generate a motor velocity, this would lead to unwanted noise and delay.

In other cases, the electrical behaviors of the motor may be used to model a motor system to obtain an estimation of motor velocity using an equation:

$$L \times \frac{di}{dt} + i \times R + k_e \times \omega + V_b = V_p$$

where L and R are the inductance and resistance of the motor system, respectively; i is the armature current of a brushed motor, di/dt=0; $k_e$ is a motor back-EMF (BEMF) constant; ω is the motor velocity; and $V_b$ and $V_p$ are the brush drop voltage and a voltage after a PWM bridge. In most instances, it is difficult to obtain a proper value for $V_b$, and that, in turn causes an inaccuracy in the estimation of the motor velocity, leading to a bad feel of the steering control of the EPS system. This is a particular concern when the handwheel is maintained in a stationary position. In such a case, the estimated motor velocity using the above equation would have an offset from zero, which is a concern.

Accordingly, it is desirable to obtain an accurate estimation of motor velocity.

SUMMARY

These and/or other advantages and features will become more apparent from the following description taken in conjunction with the drawings.

Example embodiments may address at least the above problems and/or disadvantages and other disadvantages not described above. Also, example embodiments are not required to overcome the disadvantages described above, and may not overcome any of the problems described above.

According to an aspect of an example embodiment, a motor control system of a motor is provided, the motor control system comprising a state observer module. The state observer module comprises a state estimation observer/model system, which mimics motor shaft dynamics based on the motor torque; and a compensator. The compensator may compute a tracking command signal, used to bring the estimated position signal into convergence with the measured position signal. The compensator may comprise a proportional-integral-derivative (PID) controller circuit, and may be configured to: receive an error e(t), which is a difference between the sensed position and the estimated position, and output a compensated command signal based on the error e(t) and tuning parameters of the PID controller circuit. The PID controller may further comprise a lowpass filter module for derivative terms, for preventing the impact of high-frequency signals, and a saturation module for anti-windup of integral terms. The state observer module further comprises the state estimation observer/model system, which mimics motor shaft dynamics based on its reduced inertia-damping system. This state estimation observer/model system is configured to: receive a motor command signal, receive the compensated command signal from the compensator, compute the estimated velocity as a measured state of a plant model of the motor control system based on the motor command signal and the compensated command signal from the compensator circuit, and output the estimated velocity to be converted into the estimated position by an integrator.

The motor control system may further comprise a motor-velocity based lowpass filter module. The state estimation observer/model system is configured to output the estimated velocity to the motor-velocity based lowpass filter module, where the cutoff frequency of the lowpass filter module may depend on the previous estimation of the motor velocity.

The state estimation observer/model system may compute the estimated velocity by adding the compensated command signal to the motor command signal. Here, the motor command signal serves as a feedforward command of the motor control system.

The motor may be is a brushed motor.

According to an aspect of another example embodiment, an electric power steering (EPS) system is provided comprising a motor and the state observer module.

According to an aspect of another example embodiment, a method for determining an estimated motor velocity of a motor is provided, the method implemented by a control module of a motor control system. The method comprises receiving a sensed position and an estimated position, determining an error e(t) between the sensed position and the estimated position, generating a compensated command signal based on the error e(t) and tuning parameters of a compensator circuit, and computing an estimated velocity as a measured state of a plant model of the motor control system based on the motor command signal, the error e(t), and the compensated command signal. The estimated position may be computed using a state estimation observer/model system, a compensator comprising a PID controller, and an integrator.

The method may further comprise determining an estimated motor velocity based on the sensed position.

The estimated velocity may be transmitted through a motor-velocity based lowpass filter.

The motor may be a brushed motor.

BRIEF DESCRIPTION OF THE DRAWINGS

Subject mater which is regarded as one or more aspects of the invention is particularly pointed out and distinctly claimed in the claims at the conclusion of the specification. The foregoing and/or other features and advantages of example embodiments are apparent from the following detailed description, taken in conjunction with the accompanying drawings in which:

DETAILED DESCRIPTION

Figure 1:
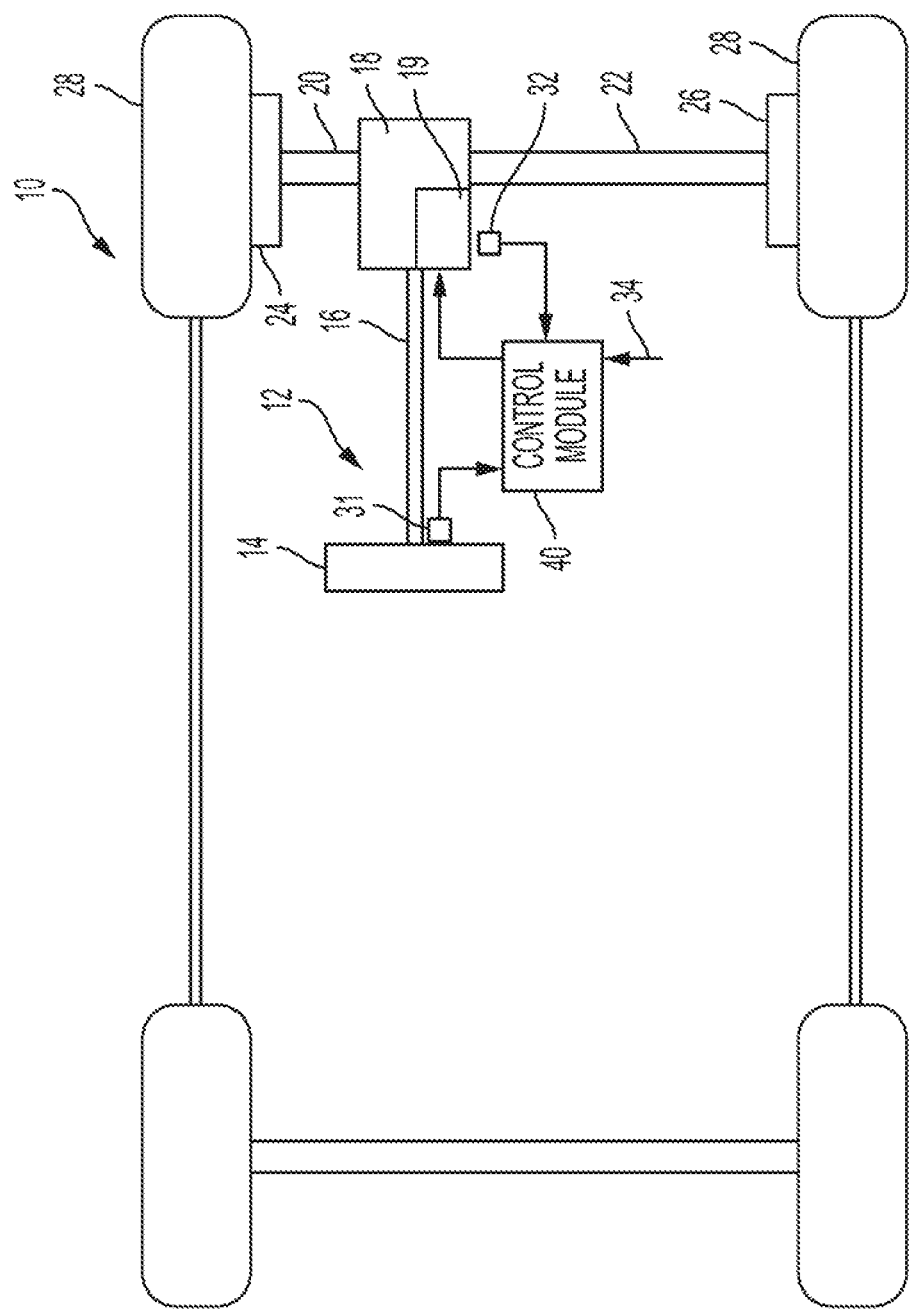
FIG. 1 illustrates a vehicle, including a steering system, according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including" "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

Referring now to the figures, example embodiments will be described without limiting the same.

In an EPS system equipped with a permanent magnet direct current (PMDC) motor, absolute or relative position sensors are used. Thus, typically, an observer module of such an EPS system estimates a motor velocity signal for a motor of the EPS system by using a predetermined plant model for the EPS.

For example, the control performance of the motor control system may be improved by estimating the velocity signal and using the estimated velocity signal for several purposes such as power management, current regulator gain scheduling, and feedforward disturbance compensation, among others. Further, the EPS system can use the estimated velocity signal for other functions such as damping, inertia compensation, and hysteresis compensation among other functions that enhance the stability as well as steering feel of the EPS system.

While technical features of the technical solutions are described herein in the context of EPS systems, it should be noted that the technical solutions are applicable in other settings in which DC electric machines with comparable control systems are used, such as for example industrial assembly lines, aircraft controllers, and the like, as would be understood by one of skill in the art.

A typical observer module estimates the motor velocity for a brushed motor using an open loop, and modeling motor dynamics with electric equations, as discussed above, which requires an accurate model of the brush motor (i.e. accurate parameters if resistance, brush drop voltage, etc.), which is difficult to obtain. Thus, the motor velocity estimate is highly sensitive to motor parameter estimation errors both from a dynamic and a steady state standpoint, because the motor parameters vary nonlinearly with the operating conditions and are difficult to estimate accurately. For example, in an EPS system with a PMDC motor, slight parameter estimation errors (modeling inaccuracies) result in incorrect velocity estimation near zero speed and at standstill (motor speed equal to zero). Further, depending upon the specific parameter estimate that is inaccurate, the resulting velocity estimate can have an undesirable phase lag or lead (from a dynamic standpoint). Further, the open loop nature of the observer module leads to low bandwidth signal estimate. In other words, open loop observers typically produce a signal estimate that, sometimes significantly, lags the actual signal, and have a lower magnitude as the signal frequency increases. Alternatively, a typical observer module, in the case of a brushless motor, estimates the motor velocity by differentiating a position signal that is received from a position sensor of the motor, which is typically a higher bandwidth estimate because it is produced from an actual measurement of position. However, the above-described noise and time delay remain problems associated with this method.

Therefore, typical dynamic control systems perform poorly in terms of both control performance as well as noise when low-bandwidth signal estimates are employed. For example, typical PMDC-based EPS systems use a static model of the PMDC machine to generate a velocity estimate signal. Such an estimated velocity signal has lower bandwidth and is thus insufficient for enhanced control performance. For example, when the estimated velocity signal is used for compensating a back-EMF (BEMF) of the motor of the EPS system, the closed loop system becomes unstable. Further, system level functions utilizing the estimated velocity signal as a control variable also exhibit degraded performance due to the low bandwidth nature. When such control systems are used in an EPS system, many functions require the motor velocity as an input. However, when the motor velocity has a low bandwidth or is inaccurate, the feel of steering provided to the driver is negatively impacted. One or more example embodiments described herein may address such technical challenges.

One or more example embodiments described herein may facilitate accurate estimation of the motor velocity of a motor of the EPS using an observer module, and may not require additional sensors to be used for the estimation. The EPS system may use the estimated motor velocity for functions such as damping, inertia compensation, hysteresis compensation, and the like, as well as for active power management as well as current control of the motor.

FIG. 1 illustrates a vehicle 10, including a steering system 12, according to an example embodiment. The steering system 12 includes a handwheel 14 coupled to a steering shaft system 16 which includes a steering column, an intermediate shaft, and necessary joints. The steering system 12 may be an EPS system that further includes a steering assist unit 18 that is coupled to the steering shaft system 16 of the steering system 12, and to tie rods 20 and 22 of the vehicle 10. The steering assist unit 18 may include, for example, an assist mechanism in the form of worm gearing (not shown) that may be coupled to the steering shaft system 16, to a steering actuator motor 19, and to gearing. During operation, as an operator turns the handwheel 14, the steering actuator motor 19 provides assistance to move the tie rods 20 and 22 that, respectively, move steering knuckles 24 and 26, coupled to roadway wheels 28 and 30.

As shown in FIG. 1, the vehicle 10 further includes various sensors 31 and 32, that detect and measure observable conditions of the steering system 12 and/or vehicle 10. The sensors 31 and 32 generate sensor signals based on the observable conditions. The sensor 31 may be a torque sensor that senses a driver handwheel torque applied to the handwheel 14 by the operator of the vehicle 10. The torque sensor may then generate a driver torque signal based thereon. The sensor 32 may be a position sensor that senses a rotational angle of an assist mechanism. The sensor 32 may then generate an assist mechanism position signal based thereon.

A control module 40 receives, as inputs, the one or more sensor signals from sensors 31 and 32, and may receive other inputs, such as a vehicle speed signal 34. The control module 40 generates a command signal to control the steering actuator motor 19 of the steering system 12 based on one or more of the inputs and further based on the steering control systems and methods according to one or more example embodiments described herein.

Figure 2:
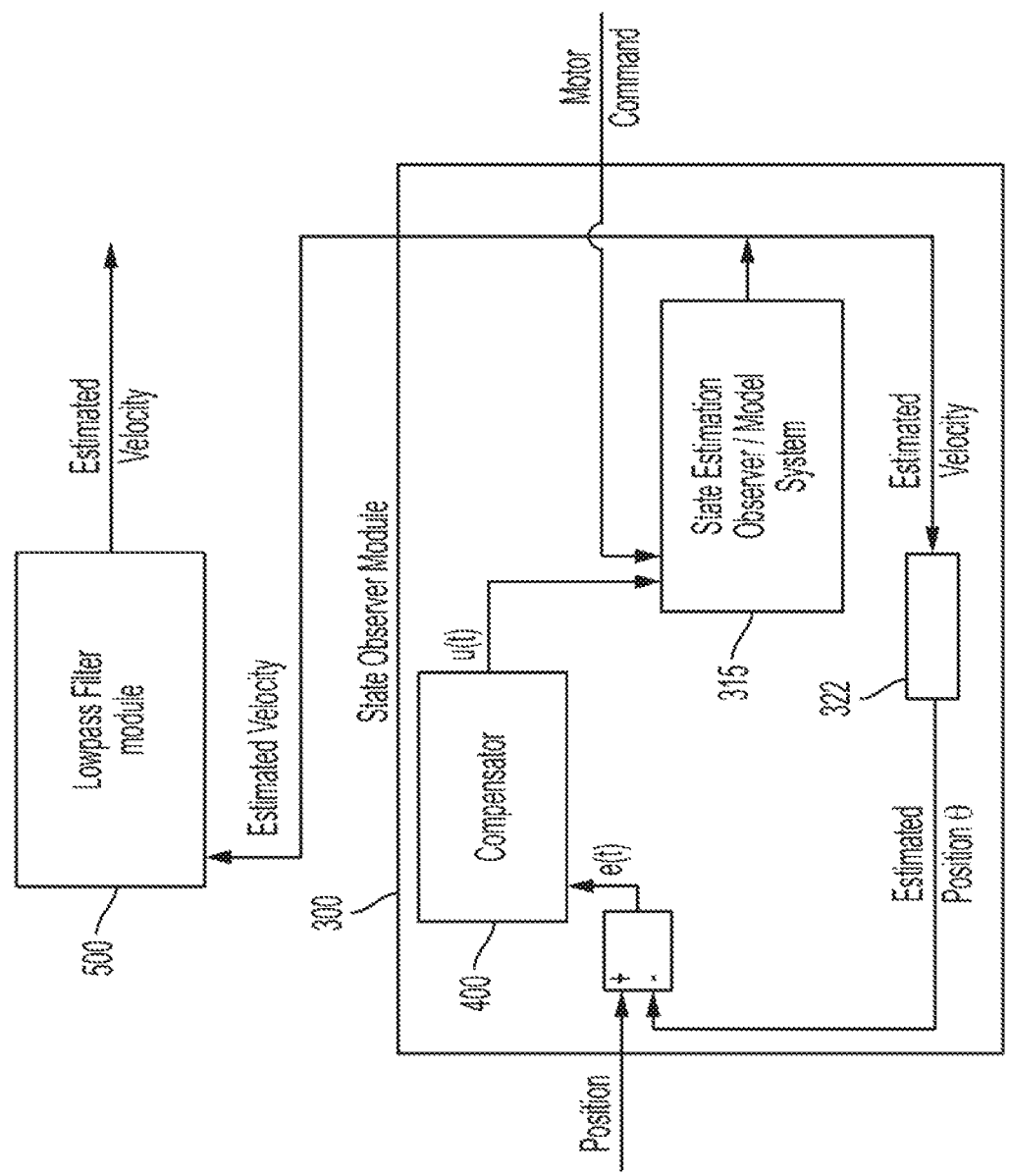
FIG. 2 illustrates a motor control system, including a state observer module and a low pass filter module, according to an example embodiment.

FIG. 2 illustrates a motor velocity estimation system according to an example embodiment. The system includes a state observer module 300, which receives a measured position of the EPS motor (which is proportional to the position of the assist mechanism based on the mechanical structure), and a motor command signal, and outputs an estimated velocity of the EPS motor. A lowpass filter module 500 receives an estimated velocity and provides a velocity-based lowpass-filtered signal. The state observer module 300 and the lowpass filter module 500, and elements thereof are shown in greater detail in FIGS. 3-6.

Figure 3:
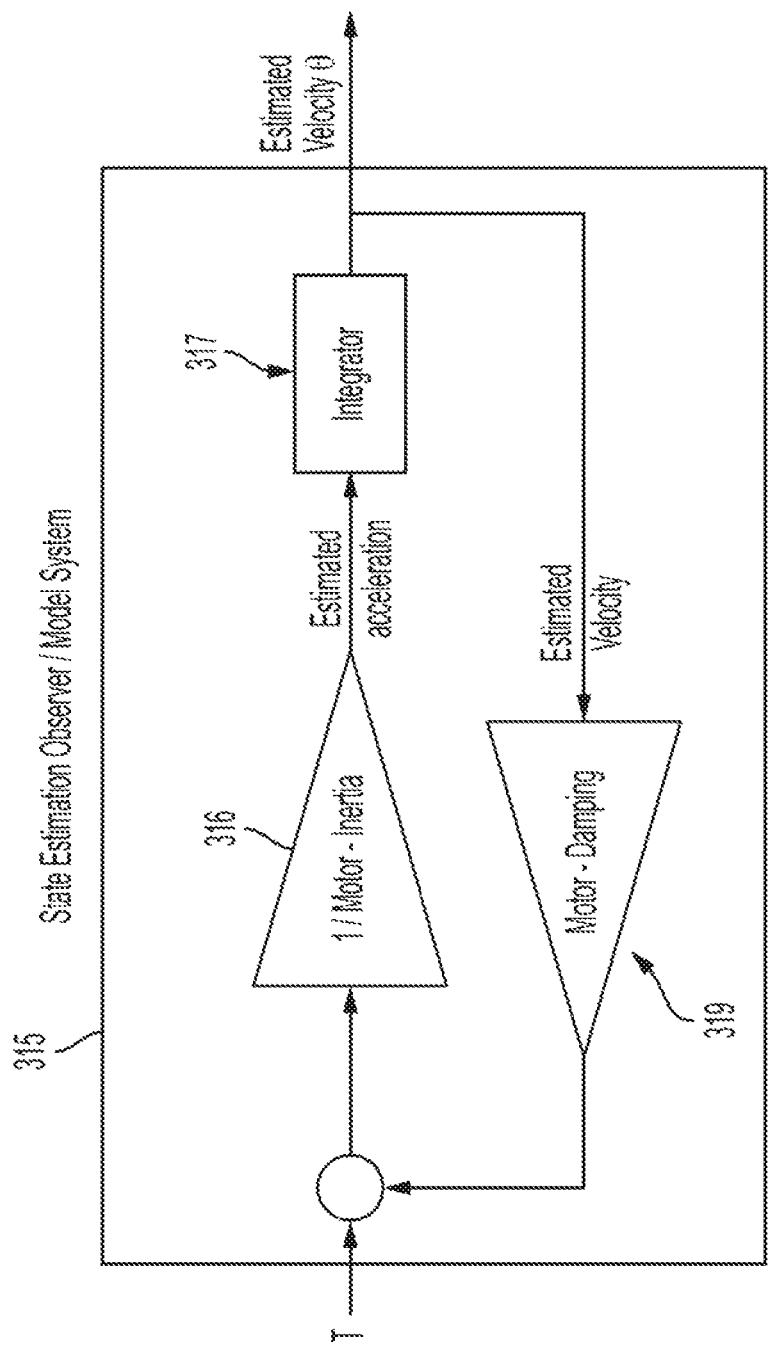
FIG. 3 illustrates a plant model of a motor of the steering system using inertia-damping simplification, according to an example embodiment.

FIG. 3 illustrates a state estimation observer/model system 315 according to an example embodiment. This system 315 mimics motor shaft dynamics and uses inertia-damping for simplification, using the following equation:

$$J \times \frac{d^2\theta}{dt^2} + B \times \frac{d\theta}{dt} = T$$

Where, J is the inertia of motor shaft system; B is the damping of this system; θ is an estimated position of motor shaft; and T is a sum of the motor torque command and a compensated command from the PID controller/compensator 400. The output of this system 315 is the estimated velocity.

Figure 4:
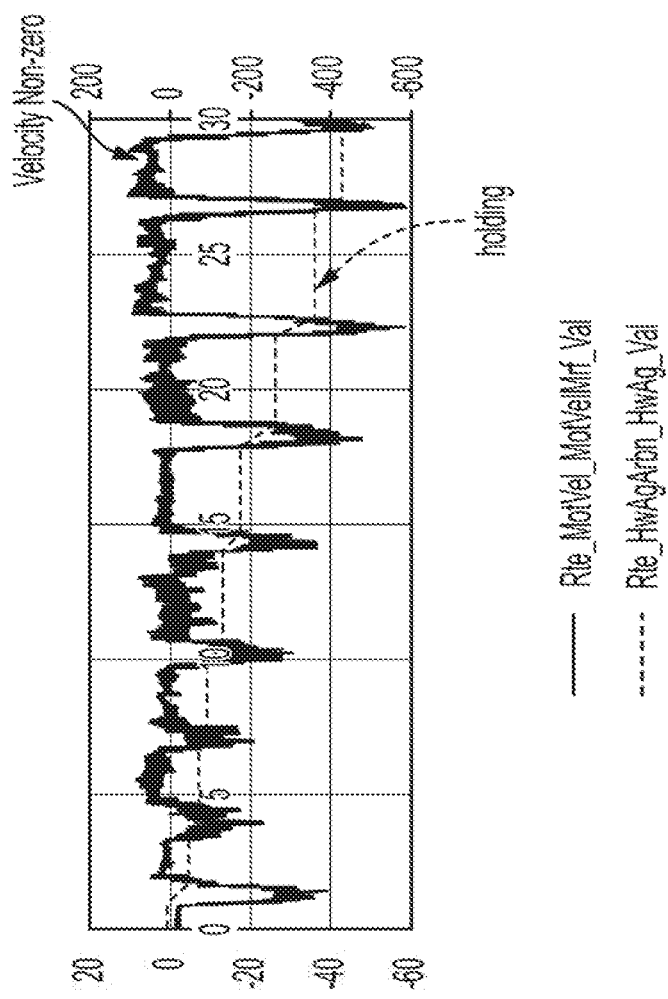
FIG. 4 is an illustrative graph showing a motor velocity offset from zero.

FIG. 4 is a graph showing the motor velocity has an offset from zero, in which time is shown on the x-axis, the motor velocity in rad/s (Rte_MotVel_MotVelMrf_Val) is shown on the left y-axis, and the position of the handwheel (Rte_HwAgArbn_HwAg_Val) is shown on the right y-axis. This data may be collected according to a method described above, or another method, as would be understood by one of skill in the art. Advantages of this method include a fast update rate and stand-alone calibration (i.e. the parameters calibrated with respect to the motor itself). However, a disadvantage is that, in a situation in which the handwheel is unmoving, the EPS output signal indicates that the motor velocity is still offset from zero, as shown in FIG. 4. Considering the mechanical structure of an EPS system, when the handwheel is kept still, the motor shaft is also stationary. Then, this offset shown in FIG. 4 is exemplary of the unwanted offset, as discussed above with respect to the related art. Thus, the accuracy of this related art technology is highly dependent on the accuracy of the measured parameters. However, given the mass-production of EPS systems, it is costly to measure parameters of all parts of the system. Additionally, the brush drop voltage is impacted by the operating temperature and has a non-linear relationship with the armature current. Both of these issues result in a greater deviation of a measured brush drop voltage from its actual value. In contrast, estimation of motor velocity according to an exemplary embodiment described herein is not sensitive to parameter variations. Rather, the estimated position is made to converge toward the measured position by a well-tuned compensator. Thus, the estimated motor velocity is also made to converge with the actual velocity.

This inaccurate indication of a non-zero motor velocity may negatively impact the system dynamic response and may lead to a system with more noise at holding.

Moreover, under some conditions, one or more of the vehicle's wheels may be blocked while the driver continues to apply torque to turn the handwheel. In this circumstance, the EPS must detect the situation and lower its assist to prevent the motor from burning out. However, if the EPS system reads information of a non-zero motor velocity, it would not detect the block, and the motor may be damaged because of the heating by the armature current, where the current was supposed to be decreased. The EPS may also be negatively impacted since it has to judge the stall condition of the motor depending on the motor velocity, and the non-zero velocity when the handwheel is held still may result in a non-functioning detection of a stall condition.

One or more example embodiments described herein may improve performance of the brush motor speed estimation, in particular, with respect to a slow-moving or stopped handwheel position by utilizing a state of the physical system, as well as the electrical system.

According to an example embodiment based on Luenberger observer technology, an observer is used to mimic the physical system and track its estimated position information for the purpose of determining the estimated velocity. Input signals may include Position, which is a position, in radians, of the assist mechanism of the assist unit 18 according to an EPS position sensor, which measures the position of the assist mechanism of the EPS, and a motor assist command MotorCommand, or current feedback and an estimated $K_e$, as discussed below.

The position of the assist mechanism is tracked and is proportional to the motor shaft position. The specific proportional ratio is a gear ratio of the assist mechanism which is a fixed value, determined based on the mechanical structure. The compensator 400, comprising a proportional-integral-derivative (PID) controller, is a control loop mechanism employing feedback which is used to compensate for an error between the position measured by the EPS position sensor and the estimated position of the assist mechanism. Thus, the PID controller provides compensation for the state estimation observer/model system 315. The PID controller can be separately tuned to achieve the best dynamic performance. The measured position is obtained by an EPS position sensor employing an angle sensor and the estimated position is an estimated angle, and therefore, the error tracking can be applied to a system with either an absolute or a relative angle sensor.

The dynamics of the motor rotor is used to model the physical system. The motor command is applied to the state estimation observer/model system in order to generate an equivalent dynamic response of the motor. Alternately, the current feedback and estimated Ke may be used with respect to an actual torque motor. The latter takes the lag of the motor current tracking into consideration and also can operate at a fast updating rate, and thus, position tracking performance may be improved.

Figure 5:
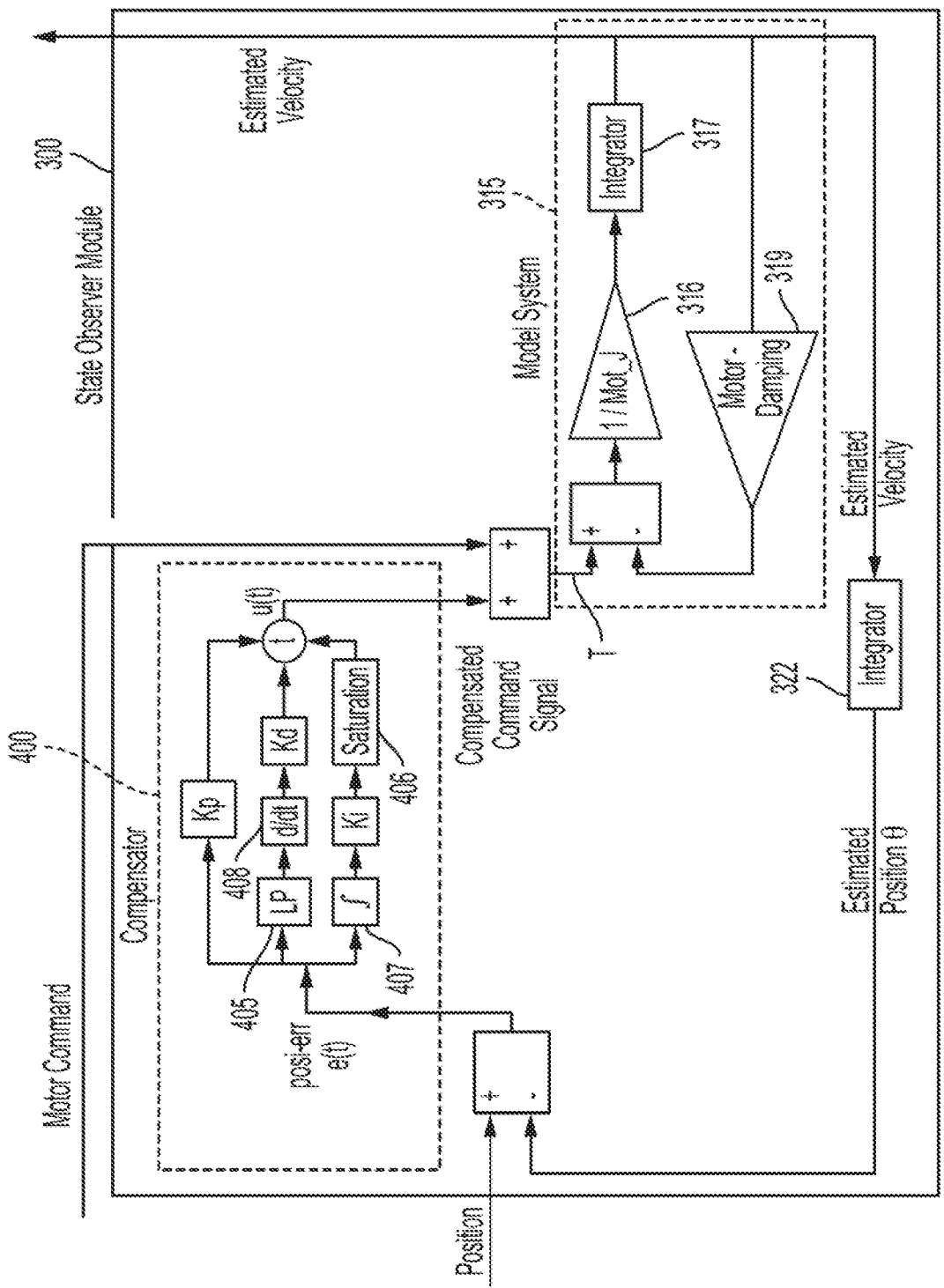
FIG. 5 illustrates dataflow of a state observer module according to an example embodiment.

FIG. 5 illustrates dataflow of the state observer module 300, including the compensator 400, comprising the PID controller, and the state estimation observer/model system 315, according to an example embodiment. The state observer module 300 receives the measured position signal Position from the EPS position sensor, and compares is to the estimated position, and calculates an error signal e(t), which is a measure of the error between the measured position and the estimated position. The compensator 400, comprising the PID controller, receives the error signal e(t).

Typically, a PID controller operates according to the following equation:

$$u(t) = K_p e(t) + K_i \int_0^t e(t')dt' + K_d \frac{de(t)}{dt},$$

where u(t) is the controller output (i.e. an arbitrated signal—herein the compensated command signal); e(t) is the error value (here, defined as the difference between the measured position and the estimated position); $K_p$, $K_i$, and $K_d$ are the tuning parameters of the PID controller, namely, the proportional gain ($K_p$), the integral gain ($K_i$), and the derivative gain ($K_d$). The gains may be weighted differently. For example, $K_d$ may be weighted 0.005, $K_i$ may be weighted 50, and $K_p$ may be weighted 20. The controller may operate using different tuning parameters than those in the above example, or may omit one or more of these example tuning parameters using, for example, one or more switches (not shown). For example, in some applications, there may be excessive noise associated with one or more of these parameters and it may be omitted, by way of a switch, from the PID controller calculations. The tuning parameters may be predetermined values and/or configurable values that are tuned during runtime. The output of the PID controller is the output u(t), which, here, is the compensated command signal. As shown in FIG. 5, the PID of the compensator includes a lowpass filter 405 before the derivative item 408, for noise-attenuation, and includes a saturation block 406 to eliminate windup caused by the integral item 407.

The state estimation observer/model system 315, of the state observer module, receives the input motor assist command MotorCommand_Motor, and the controller output u(t) from the PID controller (here, the compensated command signal).

The estimated position, converted from the estimated velocity by the integrator 322, is output to the compensator 400.

Figure 6:
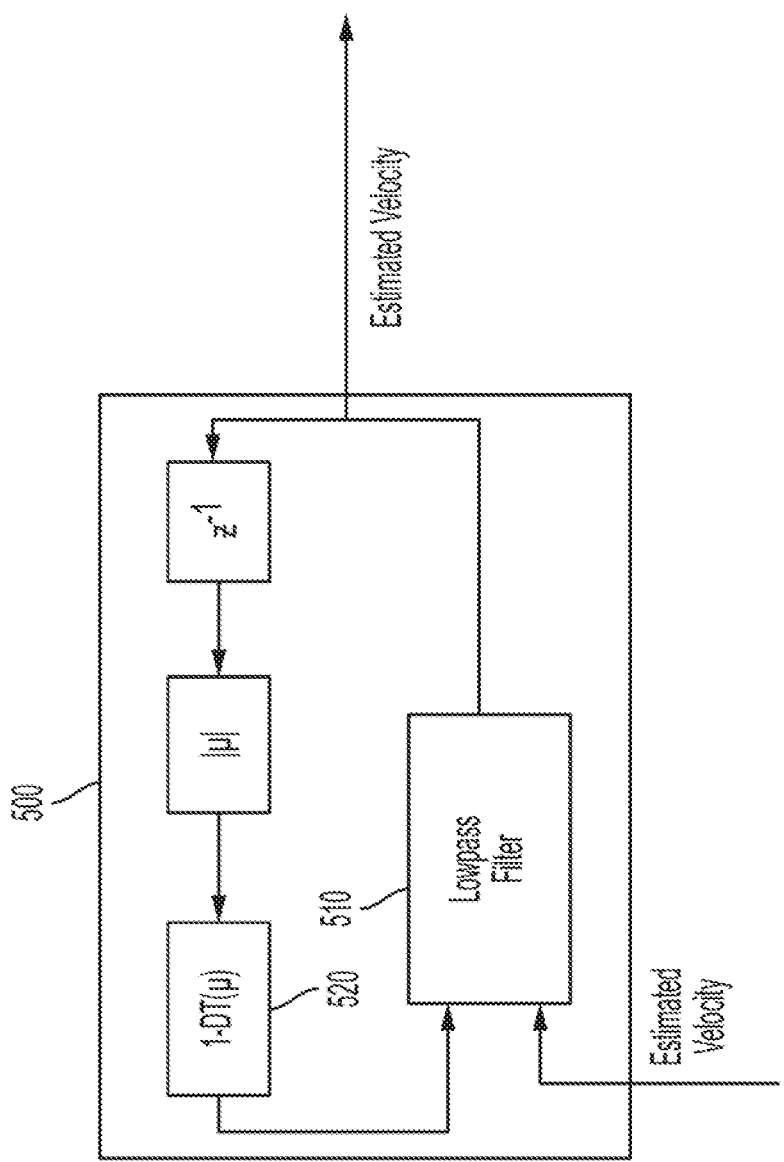
FIG. 6 illustrates a motor-velocity based lowpass filter 500, according to an example embodiment.

FIG. 6 illustrates a motor-velocity based lowpass filter module 500, according to an example embodiment. The lowpass filter module 500 includes a motor-velocity based lowpass filter 510 and a lookup table 520 for the cutoff frequency of the lowpass filter 510.

As can be seen, in this system, the command operates by feed forward control, which results in faster tracking, but does not take into account the final value of the system output (i.e. feedback). Additionally, regarding the parameters of the motor inertia and motor damping, these can be obtained by measurement. However, their accuracy is not of particular importance, as PID tuning works based on the convergence of the estimated position and measured position. If the measured signal is well-tracked, the estimated signal will be accurate as compared to the measured signal.

Example embodiments use sensed physical dynamics and properties of the physical motor as inputs to a Luenberger model in order to model the motor response.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

It is claimed:

1. An electric power steering (EPS) system comprising:
a motor; and
a state observer module comprising:
a model of dynamics of the motor shaft of the motor, which receives a torque command signal and a compensated command signal and calculates an estimated motor velocity based on an inertia-damping response to dynamics of the motor shaft; and a compensator circuit comprising a proportional-integral-derivative (PID) controller which an error signal indicating an error between the sensed position of the motor and an estimated position of the motor, and outputs the compensated command signal calculated based on the error signal and tuning parameters of the PID controller;

wherein the PID controller comprises:
- a proportional controller, a derivative controller, and an integral controller;
- a lowpass filter which filters the error signal as transmitted to the derivative controller; and
- a saturation module which saturates an output of the integral controller.

2. The EPS system according to claim 1, further comprising:
a motor-velocity based lowpass filter, wherein the model is configured to output the estimated motor velocity to the motor-velocity based lowpass filter.

3. The EPS system according to claim 1, wherein the state observer module further comprises:
an integrator which receives the estimated motor velocity from the model and outputs an estimated position of the motor; and
an adder which receives the sensed position of the motor and the estimated position of the motor and outputs the error signal to the compensator circuit.

4. The EPS system according to claim 1, wherein the motor is a brushed motor.

* * * * *